C. J. MIDDLETON.
MEASURING INSTRUMENT.
APPLICATION FILED APR. 15, 1918.

1,403,972.

Patented Jan. 17, 1922.

Inventor:
CHARLES J. MIDDLETON
by Emery, Booth, Janney & Varney
Attys.

UNITED STATES PATENT OFFICE.

CHARLES J. MIDDLETON, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

1,403,972.  Specification of Letters Patent.  Patented Jan. 17, 1922.

Application filed April 15, 1918. Serial No. 228,766.

*To all whom it may concern:*

Be it known that I, CHARLES J. MIDDLETON, a citizen of the United States, and resident of Foxboro, in the county of Norfolk and Commonwealth of Massachusetts, have invented an Improvement in Measuring Instruments, of which the following description, in connection with the accompanying drawings, is a specification, like characters on the drawings representing like parts.

This invention relates to measuring instruments and in particular to that type of instrument wherein a hand moving over a face or dial gives an indication of the response of the measuring instrumentalities. As an example of my invention I have here illustrated it as applied to a pressure gage designed for use as an airplane speedometer.

My invention will best be understood by reference to the following description of the illustrative embodiment thereof shown in the accompanying drawings wherein:—

Figure 1:
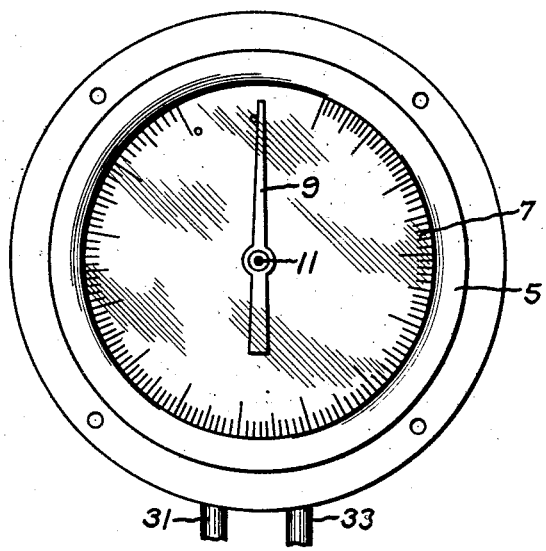
Figure 1 is a front elevation of the instrument.

Referring to the drawings, the instrument disclosed embodies a suitable casing 3 closed in front by the bezel 5 through the glazing of which is displayed a face or dial 7. The hand or pointer 9 rotated by shaft 11 is adapted to sweep over the scale on this dial and indicate the pressure measured by the instrumentalities illustrated in Fig. 2.

Figure 2:
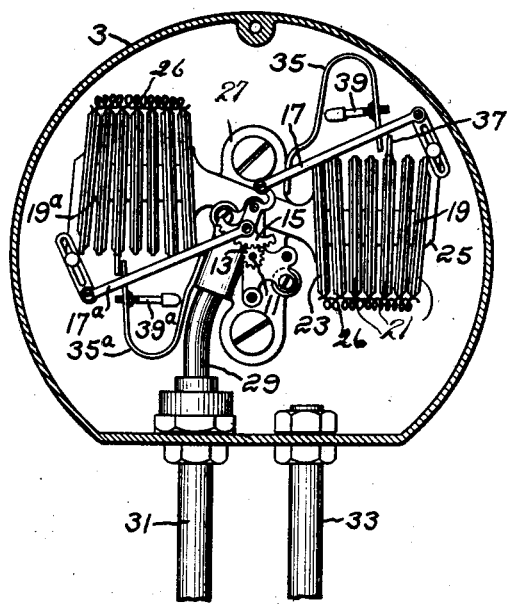
Fig. 2 is a section disclosing the interior mechanism in elevation.

Referring to Fig. 2, the shaft 11 is here shown as carrying a pinion 13 which is revolved by a sector gear 15 adapted to be rocked by connecting rods 17 and 17$^a$ attached to pressure sensitive members 19 and 19$^a$. As the members 19 and 19$^a$ are similar, a description of one will suffice.

The devices which move the hand may be of any suitable sort adapted to be distorted when exposed to the conditions which the instrument is adapted to measure, the amount of this distortion as transmitted by a motion-transmitting connection, such as the connecting rod 17 and sector gear 15, serving as a measurement. Herein, however, I have shown a device subject to deformation under pressure and in the form of an expansion tube consisting of a number of intercommunicating diaphragms 21 and having, as a whole, a fixed head 23, by which it is supported in the instrument, and a movable head 25, to which rod 17 is secured. A spring 26 is secured along one side this expansion tube and therefore, if the pressure within the same is varied, the movement is not so free on this side as the other and the tube will bend laterally. The motion due to this bending will be transmitted through the rod 17 to the shaft 11.

Herein the two tubes 19 and 19$^a$ are disposed symmetrically about the axis of sector 15 and the rods 17 and 17$^a$ are connected to equal cranks extending oppositely from that axis so that the motions of the two tubes reinforce each other. The purpose of this is to balance the effect of gravitation on the pointer or hand 9 if the instrument is tipped as it will be if used on an airplane for example. Thus, if the sheet of drawings is turned and viewed from the right hand side, it will be seen that if the instrument be in that position, the effect of gravity on the tube 19 is to rotate the sector gear 15 clockwise, but that this effect is balanced and equalized by the gravitational effect of the tube 19$^a$ which is applied through connecting rod 17$^a$ upon the opposite side of the axis of the sector gear and through an equal lever arm. This construction is disclosed in U. S. patent to Edgar H. Bristol, #1,240,790 to which I refer for a fuller description.

The fixed heads 23 of the two tubes are carried on a standard 27 providing ducts from the interior of the tubes communicating with pipes 29 and 31 which may lead to any suitable source of pressure, for example, a Pitot tube or a Venturi tube. The instrument herein disclosed responds to the algebraic difference of two pressures and it may be supposed that suction is created in the pipe 31 and that positive pressure is admitted through pipe 33 to the interior of the casing but to the exterior of the expansion tubes.

Referring to Fig. 1 of the drawing, it will be noted that on the dial there shown the spaces between the major divisions are substantially equal throughout the extent of the same. It may be supposed, for example, that the dial is graduated in miles per hour, it being understood that this refers to the speed of the airplane on which the instrument is mounted relative to the air through which it moves. The longer divisions might then each indicate ten miles. In instruments of this character, hitherto, the angular displacement of the hand due to an incremental variation in pressure has been much less at the lower ranges of the instrument. In other words, an arc which would measure ten miles on the dial in about the location of the numeral II on a clock dial would be much shorter than the arc which would measure ten miles at a location corresponding to the numeral X on a clock dial. The result, particularly noticeable when the range of the instrument was large, was that the first part of the scale was crowded and comparatively difficult to read. My invention provides means whereby this part of the scale may be opened out, as it were, and the discrepancy between the various increments thereof minimized.

For this purpose I provide means for modifying the responsive movement of the hand under pressures introduced to the expansion tubes. Referring to Fig. 2, I have there shown a resilient abutment in the form of a bowed spring 35 having one arm attached to the standard 27 carrying the expansion tube and the other free arm extending in the path of one of the intermediate diaphragms of the tube which may be provided with a lug 37 adapted to make contact with the arm of the spring 35 as the tube is deformed under pressure. Thus, after the initial movement of the tube a yielding resistance to its further deformation will be introduced (at least in so far as the diaphragms at the left of the lug 37 are concerned), so that a greater pressure than would otherwise be required is necessary to produce the same amount of distortion. It will therefore be readily understood that, since the incremental spaces on the dial represent variations in pressure, the distance traversed by the hand for a given variation of pressure in the later stages of movement of the tube is correspondingly shorter than it would have been had the abutment 35 been omitted.

Preferably I also provide means whereby a still greater resistance is introduced after the resilient abutment has yielded a predetermined amount and this is herein exemplified as means which cuts out a part of the spring and provides a positive resistance where before there was a yielding resistance. I have herein shown a screw 39 carried by one of the arms of the spring, in which it may be adjusted by rotation, and extending toward the opposite arm. After the spring has somewhat yielded, the end of the screw will seat against this opposite arm which has the effect of putting out of action the upper portion thereof. In other words, a much shorter and therefore stiffer spring will then oppose deformation of the expansion tube.

In the type of instrument such as I have here illustrated, two expansion tubes are used and as shown the member 19$^a$ is provided with the bowed spring 35$^a$ one arm of which carries the screw 39$^a$, in all respects similar to the corresponding parts 35 and 39 on the tube 19. Preferably I provide that the resistances introduced by these members shall act successively to provide a resistance to movement of the hand 9 increasing in a number of steps, herein four. For example, it may be supposed that the parts are so adjusted that first, the extension 37 will seat on the free arm of spring 35; next, the corresponding extension on tube 19$^a$ will seat on the arm of spring 35$^a$; thirdly, that screw 39 will come into play; and lastly, that 39$^a$ will act.

It may be noted that the provision of the retarding mechanism described does not affect the balanced condition, as regards gravity, of the type of instrument shown. Viewing the drawing from the right hand side again, and supposing the extension 37 to have seated, it will be seen that the tendency of the tube 19 alone is to fall so that the extension would leave the arm of spring 35, but this is balanced by the weight of tube 19$^a$ which, transmitting through the connecting rods, keeps the extension 37 seated.

Having thus described a specific form of my invention, embodying mechanical details which might be varied without departing from the spirit thereof, the principles exemplified thereby and which I desire to secure by Letters Patent I shall define in the following claims:—

1. In a dial instrument wherein a hand is moved by the deformation of a sensitive member, means to modify the responsive movement of the hand comprising a bowed spring having a free arm presented in the path of the member and a member carried by one arm of the spring and arranged to seat on the other arm when the spring yields to a certain point.

2. In a dial instrument wherein a hand is moved by the deformation of a sensitive member, means to modify the responsive movement of the hand comprising a bowed spring having a free arm presented in the path of the member and a screw threaded in one arm and having an end presented toward the other arm to seat on the same when the spring yields to a certain point.

3. A dial instrument having a hand, an expansion tube comprising a plurality of communicating diaphragms and having a fixed head and a movable head, a motion-transmitting connection between said movable head and the hand, a bowed spring having an arm fixedly supported adjacent said fixed head and a free arm cooperating with an intermediate diaphragm which seats on the same as the expansion tube is distorted.

4. A dial instrument having a hand, an expansion tube comprising a plurality of communicating diaphragms, means on one side of the tube to restrain relative movement of the diaphragms whereby the tube as a whole will be distorted laterally by pressure, a motion-transmitting connection between said tube and the hand and abutment means for cooperation with an intermediate diaphragm and against which it seats in its movement.

5. A dial instrument having a hand, an expansion tube comprising a plurality of communicating diaphragms, a motion-transmitting connection between said tube and the hand, a yielding abutment for cooperation with an intermediate diaphragm and against which it seats in its movement and means effective on yielding of the abutment to increase the resistance of the same.

6. A dial instrument having a hand, an expansion tube comprising a plurality of superposed communicating diaphragms and means at one side of the tube to restrain relative movement of the diaphragms whereby the tube as a whole will be distorted laterally by pressure, a motion-transmitting connection between the tube and the hand and means effective after initial distortion of the tube to introduce added resistance to relative movement of diaphragms of the tube.

7. A dial instrument having a hand, a pair of expansion tubes for moving the same and yielding means for resisting distortion of the tubes at intermediate phases of their movements arranged to function at different times for the different tubes.

8. A dial instrument having a hand, a pair of expansion tubes for moving the same, yielding means for resisting distortion of the tubes at intermediate phases of their movements, means effective on the yielding of such means to provide increased resistance thereof, said several means acting at different times.

In testimony whereof, I have signed my name to this specification.

CHARLES J. MIDDLETON.